United States Patent [19]

Chen

[11] Patent Number: 5,038,625
[45] Date of Patent: Aug. 13, 1991

[54] TRIBOLOGICAL HEAD-DISK INTERFACE TESTING SYSTEM

[75] Inventor: Tsu-Fang Chen, Eden Prairie, Minn.

[73] Assignee: Seagate Technology, Inc., Scotts Valley, Calif.

[21] Appl. No.: 305,001

[22] Filed: Jan. 31, 1989

[51] Int. Cl.[5] .......................................... G01M 19/00
[52] U.S. Cl. .......................................... 73/865.9; 73/7; 324/454; 360/31
[58] Field of Search ........................ 73/865.9, 7, 9, 12, 73/865.3, 866; 324/212, 454; 360/25, 31

[56] References Cited

U.S. PATENT DOCUMENTS

| | | | |
|---|---|---|---|
| 4,416,144 | 11/1983 | Chen et al. | 73/865.9 X |
| 4,692,832 | 9/1987 | Bandara et al. | 360/106 X |
| 4,724,392 | 2/1988 | Bandara et al. | 324/454 |
| 4,795,981 | 1/1989 | Ertingshausen et al. | 324/454 |
| 4,872,071 | 10/1989 | Easton et al. | 360/67 X |

FOREIGN PATENT DOCUMENTS

| | | | |
|---|---|---|---|
| 120302 | 6/1986 | Japan | 360/31 |
| 30934 | 2/1987 | Japan | 73/7 |
| 132283 | 6/1987 | Japan | 360/31 |
| 65337 | 3/1988 | Japan | 73/7 |
| 119079 | 5/1988 | Japan | 360/31 |
| 1076955 | 2/1984 | U.S.S.R. | 73/7 |

*Primary Examiner*—Tom Noland
*Attorney, Agent, or Firm*—Edward P. Heller, III; Bill D. McCarthy

[57] ABSTRACT

A tribological head-disk interface testing system for testing commercial head-disk assemblies in an accelerated fashion to determine wear life, the system comprising an interface stress device disposed on a disk with a wear tester, the interface stress device having a semispherical crystal pin mounted on a slider. Piezoelectric crystals are mounted on the slider.

13 Claims, 3 Drawing Sheets

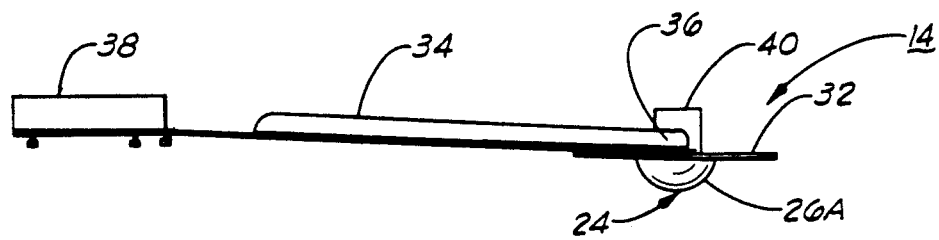
FIG. 3
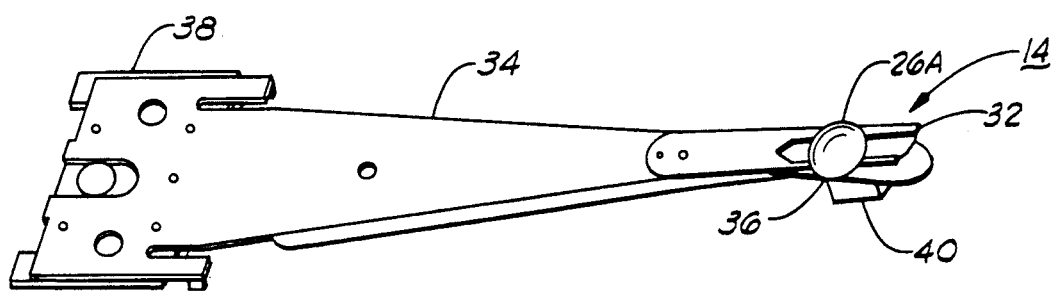
FIG. 3A
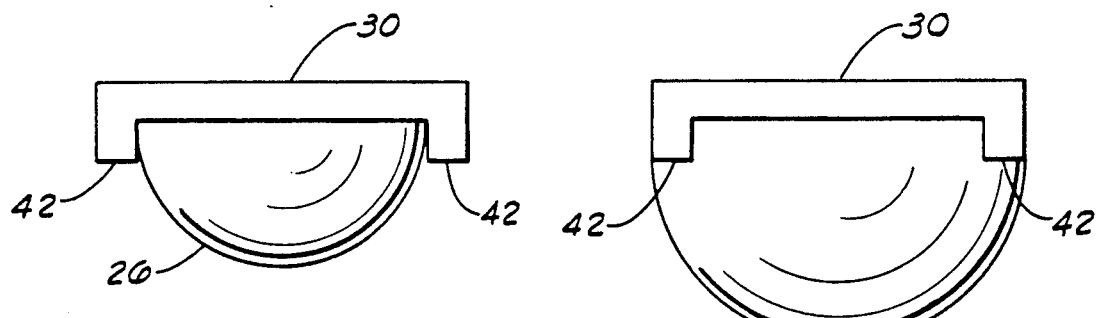
FIG. 4
FIG. 4A

TRIBOLOGICAL HEAD-DISK INTERFACE TESTING SYSTEM

BACKGROUND OF INVENTION

1. Field of the Invention

The present invention relates generally to tribological testing for head-disk interface areas in computer disk drives, and more particularly but not by way of limitation, to accelerated determination of head and disk performance degradation individually and in combination with high accuracy life expectancy predictions.

2. Brief Description of the Related Art

The science of tribological testing in head-disk assemblies has become more important as the dimensions of magnetic recording have become smaller in the attempt to make magnetic information more compact. Two documents of interest are U.S. Pat. No. 4,532,802 issued Aug. 6, 1985 to C. E. Yeack-Scranton and S. F. Vogel entitled "Apparatus for Analyzing the Interface between a Recording Disk and a Read/Write Head"; and an article by Kawakubo et al. (Hitachi Ltd., Toyko, Japan) entitled "Spherical Pin Sliding Test on Coding Magnetic Recording Disk".

U.S. Pat. No. 4,532,802 teaches a piezoelectric crystal for measuring vertical acceleration of a slider as it moves across a disk. This patent also teaches how to measure vertical acceleration of the slider.

The Kawakubo et al. article teaches a device for measuring frictional force using a spherically lapped wear slider. The slider is constructed of a crystalline material, such as ruby or sapphire.

Up to the present time resolution has not been made as to how to obtain three-dimensional acceleration analysis of a slider in motion contact with a disk. Accelerated testing of real time wear on head-disk components has not been available to provide complete information regarding three-dimensional head-disk interface contact stress.

SUMMARY OF INVENTION

The present invention deals with these problems by providing three interface stress devices: (1) a type 1 micro-pin device, a semispherical micro-pin attached to a slider which is mounted on a gimbal with a flexure arm; (2) a type 2 micro-pin device, a semispherical micro-pin attached to a gimbal with a flexure arm; and (3) a device called a slider motion and impact stress analyzer, referred to herein by the term "SMISA". FAHA is an acronym for the flexure arm and head assembly which serves to read, or write on, a computer memory disk and as used herein, FAHA will also sometimes refer to a flexure arm and head assembly modified to support a micro-pin described below.. The term "slider" refers to the head which does the reading and writing, as well as the support which serves as the vehicle for the head. As used herein the term will be used for the head for ease of reference, but strictly speaking, the term slider usually refers only to the vehicle.

In a type 1 micro-pin FAHA device, the semispherical micro-pin is attached to the slider for simplifying head-disk contact geometry to a point contact for the purpose of providing a well defined stress condition at the head-disk interface in tribological testing, and for adjusting the stress levels by using different diameter micro-pins when accelerating the wear life test. In a type 2 micro-pin FAHA device, the micro-pin is mounted directly on the gimbal instead of the slider.

Piezoelectric crystals are mounted on the slider in the SMISA embodiment to provide from one to three dimensions of data of FAHA motion so as to allow for more complete analysis of stress and motion. The term FAHA as used herein will refer to the flexure arm combined with the gimbal and slider.

The tribological head-disk testing system is designed to provide correlation between the performance degradation of the head-disk interface in a commercial disk drive and that experienced by using the inventive devices.

An object of the present invention is to provide apparatus and methods for tribological testing of head-disk interfaces in an accelerated fashion so as to reduce tribological test time.

Another object of the present invention is to provide three-dimensional acceleration and stress analysis of the head-disk interface.

Another object of the invention is to provide fast transducer response time close to the head-disk interface proximity so as to get more direct interpretation and more accurate understanding of the performance degradation and wear mechanisms.

Another object of the invention is to provide a simplified head-disk interface contact geometry so that motion of a FAHA device is simplified and can be more easily and accurately interpreted.

Other objects, advantages and features of the present invention will become clear from the following detailed description of preferred embodiments of the invention when read in conjunction with the drawings and appended claims.

BRIEF DESCRIPTION OF DRAWINGS

FIG. 3 is a side elevational view of a type 2 micro-pin device having a micro-pin mounted directly on a gimbal and a piezoelectric crystal mounted on the flexure end of the FAHA directly above the micro-pin.

FIG. 3A is a bottom perspective view of the FAHA with the micro-pin and the piezoelectric crystal mounted as in FIG. 3.

FIG. 4 is a side elevational view of a slider with a micro-pin mounted between the rails of the slider.

FIG. 4A is a side elevational view of a slider with a micro-pin of a larger diameter than that in FIG. 4 mounted thereon

DESCRIPTION

For the purpose of general understanding, the above mentioned prior art references are incorporated by reference herein insofar as such references serve to further assist in providing details of test procedures known and practiced by persons of ordinary skill in the tribological art of disk testing.

Figure 1:
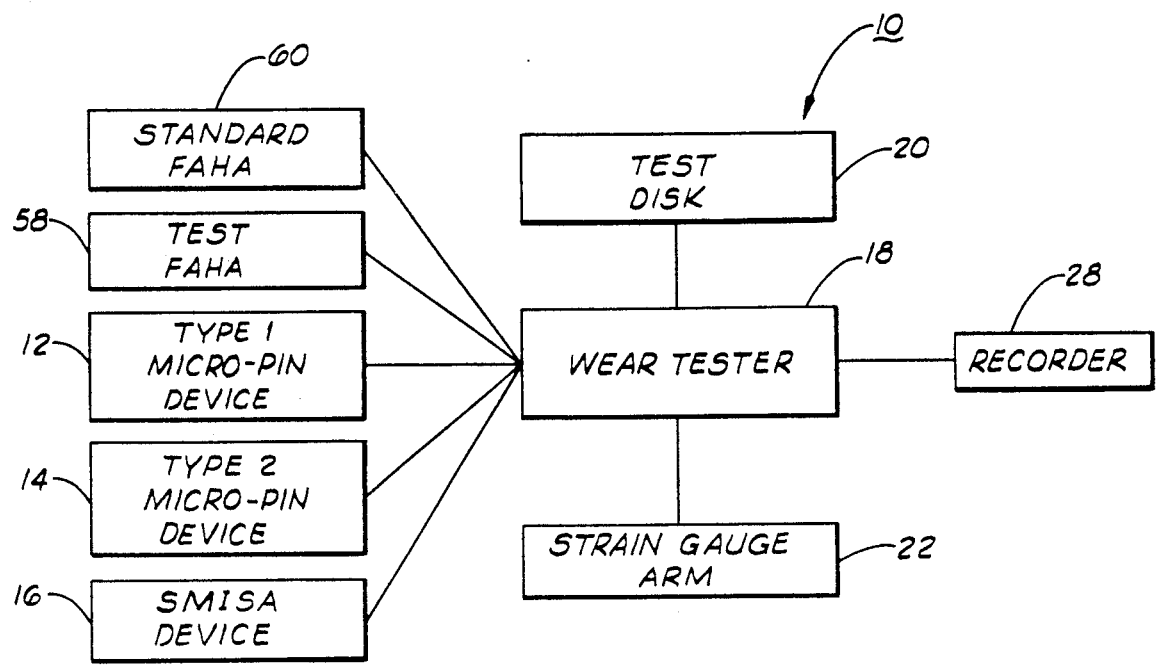
FIG. 1 is a schematic block diagram of a tribological head-disk interface testing system of the present invention depicting alternative interface stress devices.

Referring now to the drawings in general and to FIGS. 1 through 3A in particular, shown and designated by the general reference 10 is a tribological head-disk interface testing system of the present invention. The tribological head-disk interface testing system 10 is schematically depicted in FIG. 1, the heart of which is alternatively one of three interface stress devices: (1) a type 1 micro-pin device 12; (2) a type 2 micro-pin device 14; or (3) a slider motion and impact stress analyzer (SMISA) device 16.

A wear tester 18 provides a spindle (not shown) for turning a test disk 20, and as well, provides a strain gauge arm 22 for measuring friction and stiction. The wear tester 18 provides circuitry and apparatus for its own mechanical operation.

Figure 2:
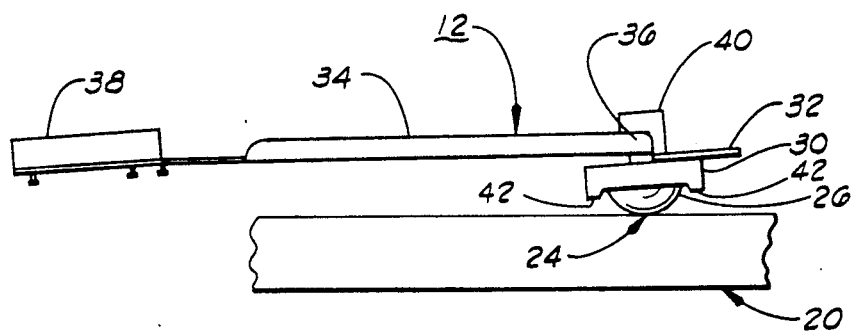
FIG. 2 is a side elevational view of a type 1 micro-pin device with a micro-pin mounted on a slider and a piezoelectric crystal mounted on the flexure end of the FAHA directly above the slider.

The strain gauge arm 22 is used to measure the "stiction" force (i.e. the force required to move the test disk 20 from a standing start when the same is in contact with an interface stress device or FAHA) and the kinetic friction at a head-disk interface 24 (FIG. 2). The term "head-disk interface" is used generically although it will be appreciated that when a type 1 device 12 or a type 2 device 14 is juxtaposed with the test disk 20, what is interfaced is the test disk 20 and a micro-pin 26 (FIG. 2). A recorder 28 (such as an oscilloscope, read/write circuits, a chart recorder, etc.) can be used in conjunction with the present invention for evaluating certain readback parameters.

Referring to FIG. 2, the type 1 device 12 and the test disk 20 are depicted in a partial side elevational view. The test disk 20 and the micro-pin 26 (of the type 1 device 12) meet to define the head-disk interface 24. In the preferred embodiment, the micro-pin 26 is made of ruby, but other hard crystal materials such as sapphire can be used.

In the type 1 device 12, the micro-pin 26 is mounted on a slider 30. The slider 30 is mounted on a gimbal 32 which is attached to a flexure arm 34 having an interface end 36 and a distal end 38. The flexure arm 34 at the distal end 38, is mounted on the strain gauge arm 22 (not shown in FIG. 2), and in turn the strain gauge arm 22 is mounted on the wear tester 18. (not shown in FIG. 2), as would be so depicted if a fuller view of the present invention were shown.

The flexure arm 34, the slider 30 and the gimbal 32 are known collectively as the flexure arm and head assembly (FAHA). The collective apparatus will from time-to-time be referred to as the FAHA in this disclosure. As mentioned hereinabove, the term 'head', which consists of a slider and a read/write transducer, may be used interchangeably with the term "slider" and this practice will be used also in this disclosure.

The micro-pin 26 is semispherical in shape, the apex of the semisphere being the one point of contact with the test disk 20. This geometry together with the diameter of the micro-pin 26 creates well defined stress on the disk 20 for investigating the wear mechanisms in a commercial disk drive unit.

A piezoelectric crystal 40 is shown mounted on the interface end 36 of the flexure arm 34. The crystal 40 is electrically connected to one or more recorders 28 (not shown in FIG. 2). The crystal 40 weighs about 0.4 milligrams. In comparison the micro-pin 26 weighs about 7 milligrams and the slider 30 weighs about 50 milligrams.

Figure 2A:
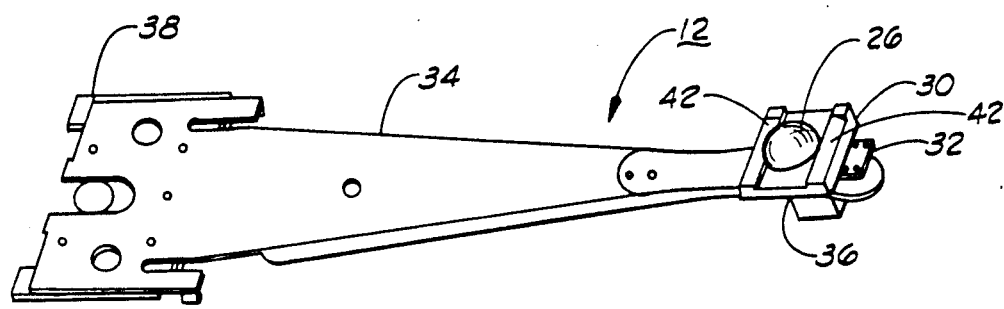
FIG. 2A is a bottom perspective view of the FAHA with the micro-pin and the piezoelectric crystal mounted as in FIG. 2.

Referring to FIG. 2A, the type 1 device 12 is shown again, this time upside down for ease of viewing, and the micro-pin 26 is again shown mounted on the slider 30.

Commercially available ruby balls can be obtained and then cut in half to obtain a semispherical micro-pin 26. The micro-pin 26 is mounted on a metal or ceramic plate with epoxy. Once the micro-pin 26 is affixed to the metal or ceramic plate, it can be cut or lapped to the desired shape for mounting on the slider 30 (in the case of the type 1 device). Typically, a diamond saw with a wheel thickness on the order of seven thousandths of an inch is used to cut the micro-pin 26. After proper shaping, the micro-pin 26 is mounted on the slider 30 (or the gimbal 32 in the case of the type 2 device) and affixed thereon with adhesive such as an epoxy.

Referring to FIGS. 3 and 3A, the type 2 device 14 is shown in a manner similar to the depiction in FIG. 2 but without the test disk 20. Once again the piezoelectric crystal 40 is electrically connected to one or more various recorders 28 (not shown in FIG. 3). In this embodiment a micro-pin 26A is mounted directly onto the gimbal 32. The benefit of this embodiment is that there is less mass and the dynamic motion of the gimbal 32 and the flexure arm 34 can be tested directly.

As shown, the larger diametered micro-pin 26A may be used in this embodiment. When the slider 30 is used, a diameter range of one to three millimeters for the micro-pin 26 is typical, and preferably, the diameter of the micro-pin 26 will be about two millimeters. This provides appropriate stress for an accelerated wear test of the head-disk interface 24 (not shown in FIG. 3).

FIGS. 2 and 3 depict alternative embodiments of micro-pin devices for practicing the present invention. Each of the micro-pin devices 12, 14 has advantages and disadvantages, and each may be more suitable depending on the needs of a particular application.

Referring to FIG. 4, the preferred manner of mounting the micro-pin 26 on the slider 30 is depicted. The micro-pin 26 is affixed between parallel rails 42 of the slider 30. The distance between the rails 42 is determined at approximately two millimeters. Since the preferred diameter of the micro-pin 26 is also about two millimeters, the fit of the micro-pin 26 between the rails 42 is usually snug.

In FIG. 4A, the diameter of the micro-pin 26A is greater than that of the micro-pin 26 of FIG. 4, so the micro-pin is notched to fit between and over the rails 42.

Figure 5:
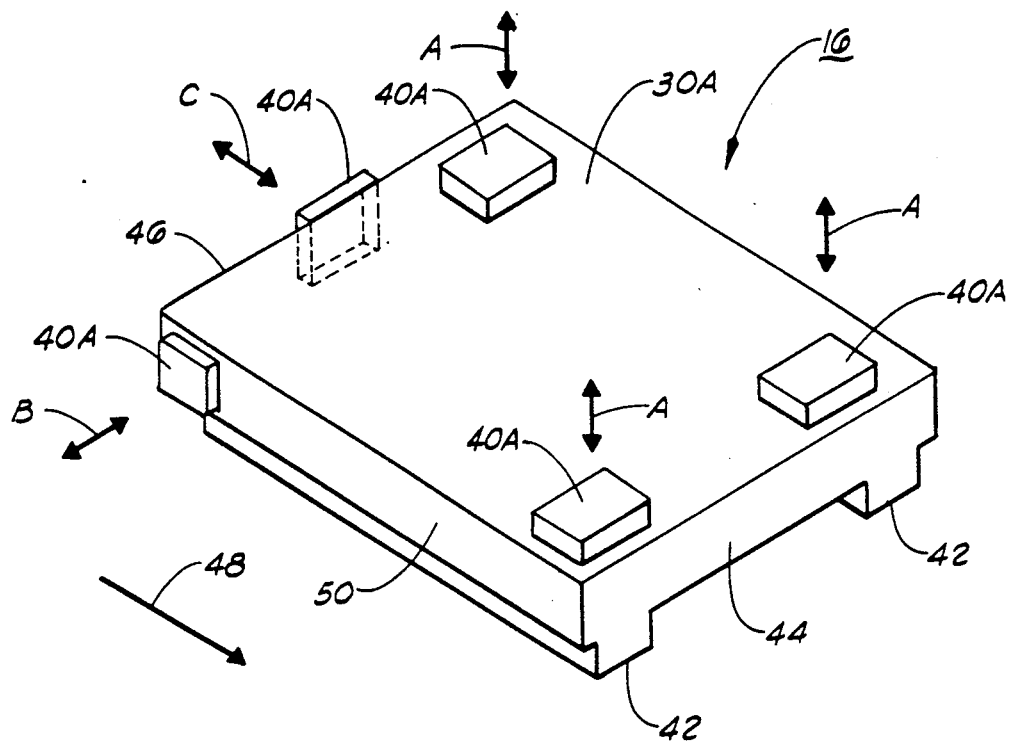
FIG. 5 is an isometric view of a slider used in a SMISA device, with five piezoelectric crystals mounted thereon.

Referring to FIG. 5, the SMISA 16 is partially shown. As indicated hereinabove, SMISA refers to slider motion and impact stress analyzer. A slider 30A of the SMISA 16 is shown, and mounted on the slider 30A are five piezoelectric crystals 40A. The slider 30A is depicted such that its trailing edge 44 is shown, while its leading edge 46 is not in view. The relative direction of disk rotation is indicated by arrow 48. Two piezoelectric crystals 40A are mounted on top of the slider 30 at the corners near the trailing edge 44. One piezoelectric crystal 40A is mounted on top of the slider 30 at a leading corner near the leading edge 46. One piezoelectric crystal 40A is mounted on the leading edge 46, and finally, one piezoelectric crystal 40A is mounted on an outer side 50 near the leading edge 46. The direction of acceleration measured by each of the piezoelectric crystals 40A is indicated by two-headed arrows A, B and C disposed in FIG. 5 near the crystals 40A. Three of the piezoelectric crystals 40A are shown detecting vertical acceleration of the slider (arrows A). One piezoelectric crystal 40A is shown detecting radial acceleration (arrow B). Finally, one piezoelectric crystal 40A, the one on the leading edge 46, detects circumferential acceleration (arrow C) of the slider 30A. In addition to the five crystals 40A mounted as depicted, the piezoelectric crystal 40 is mounted as shown in FIGS. 2 or 3. This combination of six piezoelectric crystals 40, 40A provides the capability to detect the lift, roll, pitch, and yaw accelerations of the sliders 30, 30A in dynamic application.

Figure 6:
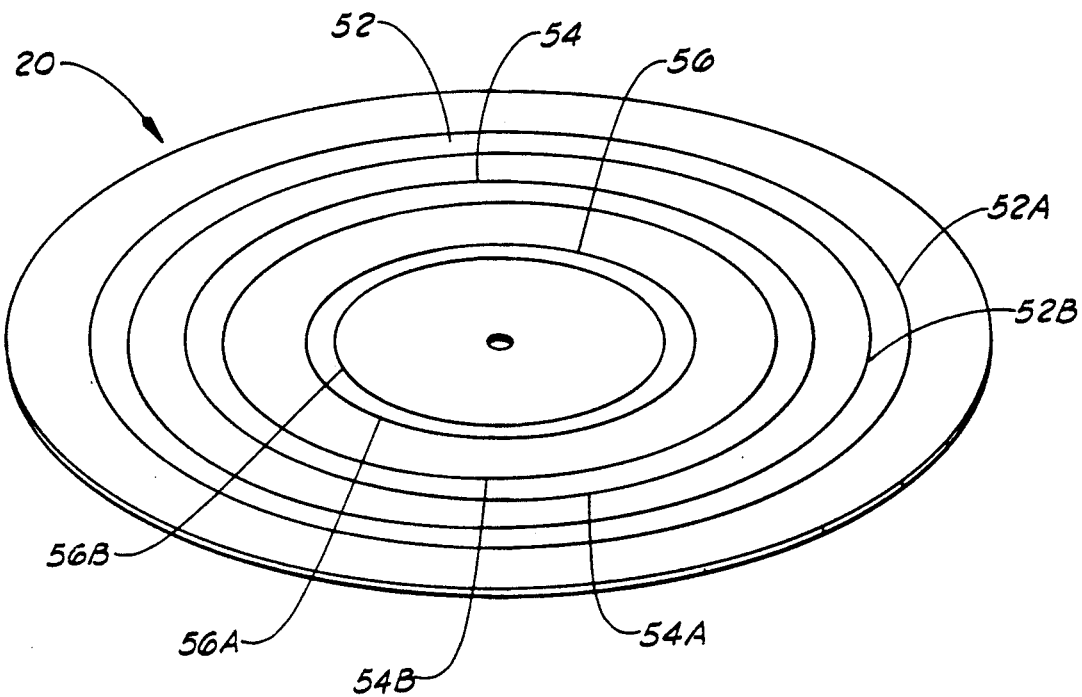
FIG. 6 is a perspective view of a test disk.

Referring to FIG. 6, the test disk 20, used in conjunction with interface stress devices 12, 14 and 16 (not shown in FIG. 6), is shown. The test disk 20 can be any selected radius, and located thereon are three pairs of tracks 52, 54 and 56. The three track pairs 52, 54 and 56 comprise individual tracks 52A, 52B; 54A, 54B; and 56A, 56B, respectively. The tracks of each track pair vary in radius dimension, with the track of greater radius in each pair designated as a test track and the track of lesser radius designated as a reference track. For example, in the first track pair 52, track 52A is the test track and track 52B is the reference track. Assuming that the diameter of the test disk 20 is eight inches, the radius of track 52A is preferably approximately three and seven eighths inches; the radius of track 56A is approximately two and three eighths inches; and the radius of track 54A is approximately three and one eighth inches.

The present invention will now be discussed relative to FIG. 1. In addition to the apparatus depicted schematically in FIG. 1, other measurement devices can be incorporated in the system, such as an acoustic emission transducer or a particle counter as may be required. The readback parameters include the amplitude of zero bits written on the test disk 20, the number of errors in reading the zero bits back, the readback envelope, and other electronic signals as may be suggested by modifications in the test procedure.

In practice, multiple FAHA devices are tested as now will be more specifically described. Although the number of such FAHA devices is optional, for the purpose of this discussion, six test FAHA devices and one standard FAHA device are used in the preferred test method of the invention. Further, it will be understood that other performance and component degradation measurements will usually be performed by equipment a needed for determining the asperity and lubricity of the test disk 20. Also, as indicated in FIG. 1 the strain gauge arm 22 is provided for detecting the stiction and the kinetic friction between the test FAHA devices, or micro-pin 26, and the test disk 20. Seven grams per head is typical of the friction necessary to bring the spindle to a complete stop in a 5¼ inch disk drive so that there is no disk rotation whatsoever. Other mechanical and electronic measurements of component and performance degradation will suggest themselves to those skilled in the art and are contemplated in practicing this invention.

The test sequence for practicing this invention may be modified in many ways within the spirit of this invention. However, the preferred test mode will now be discussed. Six test FAHA devices 58, one standard slider FAHA device 60, either a type 1 device 12 or a type 2 device 14, and one test disk 20, are selected for use in the system 10. The standard FAHA 60 is used to write all zero bits on tracks 52A through 56A. Then the amplitude, error count, and envelope are read back and recorded. The standard FAHA device 60 is removed and saved. A first test FAHA device 58 is then mounted on the strain gauge arm 22 and is parked at the outermost track or landing zone, i.e. a track with a radius greater than the test track 52A. The first test FAHA device 58 is flown into the test track 52A. The reason the test FAHA 58 is kept to the outside of tracks 52A through 56A is to avoid accidental damage or contamination to the test tracks. A continuous stream of zero bits, written with the standard FAHA device 60 is then read back from tracks 52A and 52B. Readback parameters such as the amplitude, error count and the readback envelope are measured and recorded. This is performed for both tracks 52A and 52B.

A contact start/stop test is then begun on the test track 52A. The contact start/stop test comprises starting the first test FAHA device 58 in contact with the test disk 20, with the first test FAHA device 58 being stationary. The test disk 20 is accelerated to an angular velocity sufficient to enable the first test FAHA device 58 to become airborne. This is called the takeoff velocity. Takeoff velocity is usually achieved at about 300 to 600 rpm. The test disk 20 is accelerated from a stationary position to approximately 3,600 rpm at which time the disk is immediately decelerated back to an angular velocity of zero. This contact start/stop test procedure is repeated a large number of times, preferably about one thousand times, at which time the readback data are recorded both for test track 52A and reference track 52B (using the first test FAHA device 58). All appropriate performance and component degradation tests are performed and the data recorded.

Also, the kinetic friction can be tested at the end of the thousand count contact start/stop test using the strain gauge arm 22. The static friction, i.e. the stiction, can be tested by allowing the first test FAHA device 58 to remain in contact with the test disk 20 at the test track 52A for a period of time, for example about four hours, and then determining the amount of circumferential static frictional force required to break the first test FAHA device 58 from the test disk 20.

At this point, the first test FAHA device 58 is removed from the strain gauge arm 22 and retained for evaluation. The micro-pin device, whether a type 1 device 12 or type 2 device 14, is mounted on the strain gauge arm 22. The contact start/stop test is again performed at the preferred one thousand start/stop cycle intervals. This time, because of the geometry of the micro-pin 26, the FAHA device does not actually become airborne, so the test disk 20 is accelerated to a chosen rpm (preferably between 300 to 600) and decelerated to zero rpm again. The contact start/stop test with the FAHA device is performed on the reference track 52B only. The readback data is collected using the standard FAHA device 60 at this stage of the sequence as was collected in the prior sequence except that the track that has been stressed is reference track 52B rather than test track 52A.

Once the reference track 52B has reached the same predetermined performance degradation levels as the test track 52A, this part of the test sequence is ended. The FAHA device 58 is removed from the strain gauge arm 22 and saved for evaluation. The standard FAHA device 60 is similar in all respect to the test FAHA devices 58, and all stiction, friction and acceleration data are taken and recorded. This entire test sequence is replicated, with the only differences being that instead of using test track 52A, the test track 54A is used; instead of using reference track 52B, the reference track 54B is used; and a second test FAHA device 58 is used on test track 54A. The test FAHA device 38 is used on reference track 54B while the standard FAHA device 60 is used on reference track 54A. The same standard FAHA device 60 is used on reference tracks after the micro-pin device tests. The micro-pin devices can be used repeatedly (with cleaning before reuse) because the micro-pins 26, 26B do not tend to wear appreciably relative to the wear and stress experienced by the test disk 20 and the test FAHA devices 58.

When the sequence involving test track 54A and reference track 54B has been completed, the sequence is again repeated identically in all respects to the previous sequence used for test track 54A and reference track 54B except that test track 56A and reference track 56B are used, and a third test FAHA device 58 is used on test track 56A. Once that stage of the test sequence is completed, the entire analogous procedure is used on the other side of the test disk 20 so that once again three pairs of test tracks and reference tracks are measured (using fourth, fifth and sixth test FAHA devices) for a total of six pairs of test tracks and reference tracks. When the entire data collection sequence is completed, six test FAHA devices 58 will have been used in addition to a standard FAHA device 60, with a type 1 micro-pin device 12 or a type 2 micro-pin device 14 with a micro-pin 26 or 26A affixed thereon.

At the end of the collection of all data the evaluation process can be conducted. Data are compared and analyzed to see the life expectancy and performance degradation of the test disk 20 and test FAHA devices 58, and the degree of correlation between the stress caused by the type 2 device 14 and with the standard FAHA device 60 versus the test FAHA device 58 acting alone.

The above described test sequence has two purposes. The first is to verify that the tribological head-disk interface testing system 10 can accurately simulate performance and component degradation actually experienced in a commercial disk drive. This is achieved by comparing the performance and component degradation levels of the components and reference tracks, and by comparing the stress on the test disk 20 caused by the type 2 device 14 versus the stress on the test disk 20 caused by the test FAHA device 58.

The second purpose of this test sequence is to accomplish degradation of the test disk 20 and other components, as well as performance levels, in a manner which accurately correlates with the wear at the head-disk interface in a commercial disk drive apparatus. Further, this simulation of degradation is performed with the object of achieving degradation in a process much faster than that which is achievable when an actual commercial head-disk assembly is used. In other words, the micro-pin 26 is much more effective at causing stress on the test disk 20 than the test FAHA device in a given period of time. The suggested mode of this test sequence accomplishes both these purposes, but it can be modified, e.g. taking out that part of the sequence dealing exclusively with the FAHA device 58 acting without a micro-pin 26, so that only the second purpose is accomplished.

Instead of using the contact start/stop test, a drag test can be used. The drag test consists of dragging the test FAHA device 58 or micro-pin 26 as the test disk 20 is rotated. This rotation is done at low rpm so that there is no possibility of slider take off. When the drag test is performed, the testing is preferably conducted only every one thousand rotations.

Component degradation measurements include, but are not limited to, measurement of slider 30 degradation (i.e. changes in shape and wear and tear on the slider 30); gimbal 32 changes as to structure; changes in structure in the flexure arm 34 such as distortions in shape; and the wear on the tracks on the disk 20.

The SMISA device 16 is designed for monitoring the slider 30 motion and contact stress below 600 rpm disk speed. This device is used on tracks other than those six tracks described hereinabove, and used after testing track 52B or track 54B.

It will be clear that the present invention is well adapted to carry out the objects and attain the advantages mentioned as those inherent therein. While presently preferred embodiments of the invention have been described for purposes of this disclosure, numerous changes can be made which will readily suggest themselves to those skilled in the art and which are encompassed within the spirit of the invention disclosed and as defined in the appended claims.

What is claimed is:

1. A method of testing component and performance degradation for a tribological head-disk interface apparatus having a test FAHA device, a standard FAHA device and a test disk with at least one track, the method comprising:
   (a) placing the test FAHA device in contact with the test disk;
   (b) identifying a test track on the test disk;
   (c) recording zero bits completely around each test track;
   (d) measuring selected readback parameters of the test track;
   (e) placing the test FAHA device on the test track;
   (f) rotating the test disk while accelerating and decelerating the test disk numerous times;
   (g) replacing the test FAHA device with the standard FAHA device;
   (h) measuring the selected readback parameters of the test track; and
   (i) comparing the measurements of steps (d) and (h).

2. The method of claim 1 wherein the amplitude of the zero bits is measured.

3. The method of claim 2 wherein the number of readback errors on the zero bits is also measured.

4. A method of testing component and performance degradation for a tribological head-disk interface apparatus having a test FAHA device, a standard FAHA device and a test disk with at least one track, the method comprising:
   (a) placing the test FAHA device in contact with the test disk;
   (b) identifying a test track on the test disk;
   (c) recording zero bits completely around each test track;
   (d) measuring selected readback parameters of the test track;
   (e) placing the test FAHA device on the test track;
   (f) rotating the disk and accelerating the rotation of the disk to the angular velocity at which the FAHA device would take off from the test disk were it not for the weight of same and then decelerating the test disk to zero angular velocity, and repeating the acceleration and deceleration numerous times;
   (g) replacing the test FAHA device with the standard FAHA device;

(h) measuring the selected readback parameters of the test track; and (i) comparing the measurements of steps (d) and (h).

5. The method of claim 4 wherein the acceleration and deceleration is repeated at least one thousand times.

6. A method of testing component and performance degradation for a tribological head-disk interface apparatus having at least one standard FAHA device, at least one test FAHA device, a micro-pin FAHA device, and a test disk with at least one test track and one reference track, the method comprising:

(a) identifying a test track and a reference track on the test disk;

(b) recording zero bits completely around the test and reference tracks with a standard FAHA device;

(c) measuring selected readback parameters on the test and reference tracks with the standard FAHA device;

(d) placing a test FAHA device on the test track;

(e) rotating the disk and accelerating the rotation of the disk to the angular velocity at which the test FAHA device would take off from the test disk were it not for the weight of same and then decelerating the test disk to zero angular velocity, and repeating the acceleration and deceleration at least one thousand times;

(f) measuring the selected readback parameters on the test and reference tracks with the standard FAHA device;

(g) placing the micro-pin of the micro-pin FAHA device in contact with the reference track;

(h) rotating the disk and accelerating the rotation of the disk to the angular velocity of step (e) above and then decelerating the test disk to zero angular velocity and repeating the acceleration and deceleration at least one thousand times;

(i) measuring disk wear on the reference track;

(j) measuring the selected readback parameters on the test and reference tracks with the standard FAHA device;

(k) repeating steps (b) through (j) above a selected number of times for the test disk; and (l) comparing the measurements of steps (c), (f), (i) and (j) every one thousand accelerations and decelerations.

7. The method of claim 6 wherein the kinetic friction at the interface of the disk and the micro-pin is measured.

8. The method of claim 7 wherein the static friction at the interface of the disk and the micro-pin is measured every one thousand accelerations and decelerations.

9. The method of claim 8 wherein rotation of the test disk is ultimately stopped when a predetermined performance degradation level is achieved.

10. The method of claim 9 wherein the predetermined performance degradation level is an internal friction level within the tribological head-disk interface testing apparatus of seven grams per head.

11. The method of claim 10 wherein the kinetic acceleration of a slider carrying the micro-pin is measured in one dimension.

12. The method of claim 11 wherein the kinetic acceleration of the slider is measured in two dimensions.

13. The method of claim 12 wherein the kinetic acceleration of the slider is measured in three dimensions.

* * * * *

UNITED STATES PATENT AND TRADEMARK OFFICE
CERTIFICATE OF CORRECTION

PATENT NO. : 5,038,625

DATED : August 13, 1991

INVENTOR(S) : Tsu-Fang Chen

It is certified that error appears in the above-identified patent and that said Letters Patent is hereby corrected as shown below:

Column 7, line 1, delete "38" and substitute therefor --58--; and

Column 7, line 3, delete "reference" and substitute therefor --test--.

Signed and Sealed this

Twenty-third Day of February, 1993

Attest:

STEPHEN G. KUNIN

Attesting Officer

Acting Commissioner of Patents and Trademarks